United States Patent
Mori

(10) Patent No.: US 9,211,694 B2
(45) Date of Patent: Dec. 15, 2015

(54) IMAGE FORMING APPARATUS, PRINT CONTROL METHOD AND STORAGE MEDIUM STORING PROGRAM

(71) Applicant: CANON KABUSHIKI KAISHA, Tokyo (JP)

(72) Inventor: Junichi Mori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/290,770

(22) Filed: May 29, 2014

(65) Prior Publication Data

US 2014/0367907 A1    Dec. 18, 2014

(30) Foreign Application Priority Data

Jun. 13, 2013 (JP) ................................. 2013-125009

(51) Int. Cl.
*G03G 15/00* (2006.01)
*B41F 13/66* (2006.01)

(52) U.S. Cl.
CPC ............ *B41F 13/66* (2013.01); *G03G 15/6544* (2013.01); *G03G 2215/00417* (2013.01)

(58) Field of Classification Search
CPC .......... G03G 15/6541; G03G 15/6544; G03G 2215/00827; G03G 2215/00548; G03G 2215/00426; G03G 2215/00421; G03G 2215/00822; G03G 2215/827; B65H 2801/48; B65H 13/66
See application file for complete search history.

(56) References Cited

U.S. PATENT DOCUMENTS 6,088,568 A    7/2000  Ohtani
6,406,199 B1 *  6/2002  Hayashi .......................... 400/76

FOREIGN PATENT DOCUMENTS

JP          10-236720 A    9/1998

* cited by examiner

*Primary Examiner* — Matthew G Marini
(74) *Attorney, Agent, or Firm* — Fitzpatrick, Cella, Harper & Scinto

(57) ABSTRACT

When a job that is set so as to execute binding processing at a first binding position is being executed and this job is then interrupted, a request for changing a position of the binding processing from the first binding position to a second binding position is accepted in a state where the job is interrupted. It is determined whether or not an orientation of a print target image is to be changed in order to change the position of the binding processing from the first binding position to the second binding position in accordance with the accepted request. In a case where it is determined that the orientation of the print target image is to be changed, control is performed so as not to execute the binding processing.

7 Claims, 13 Drawing Sheets

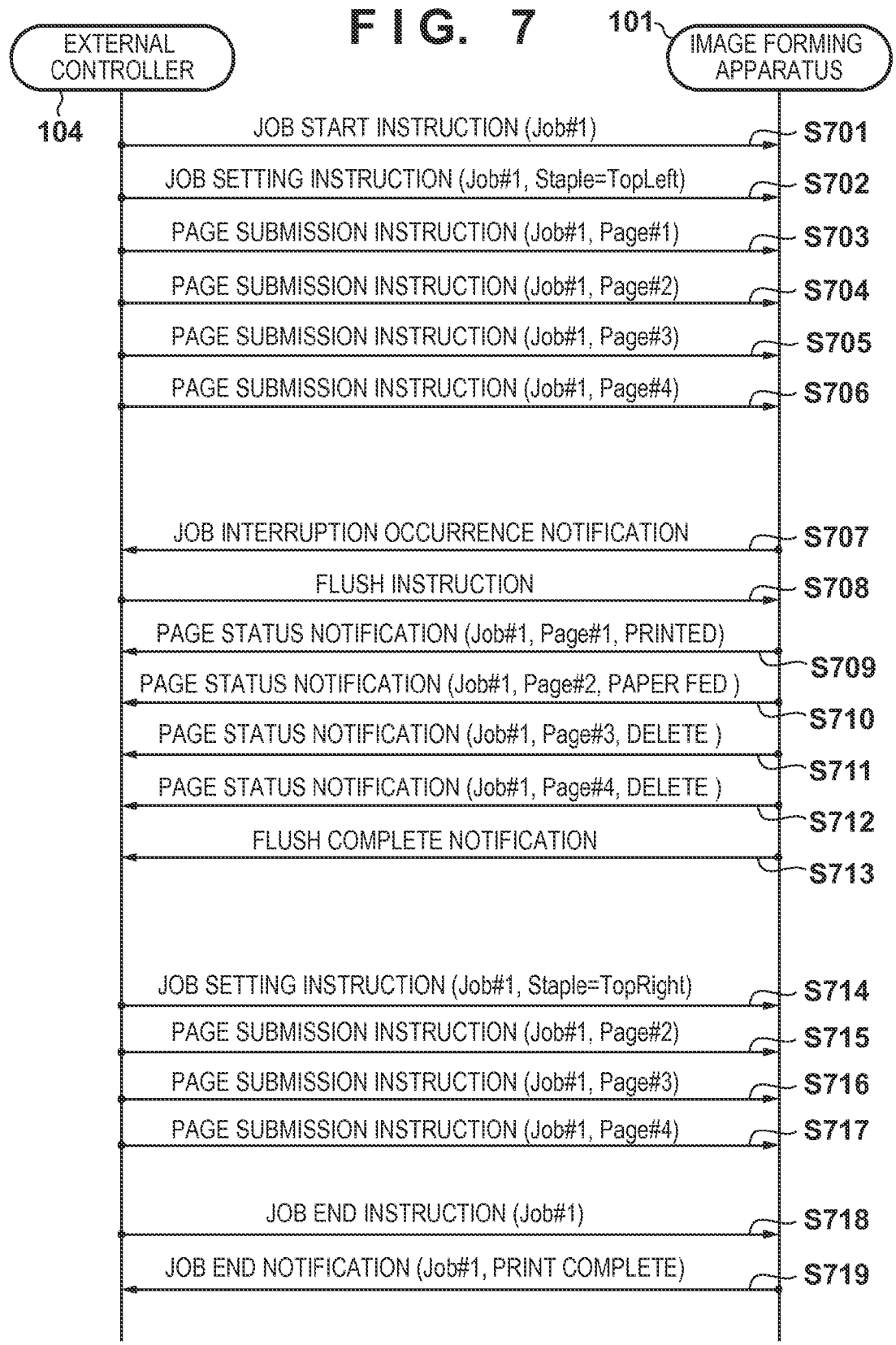

WARNING!

STAPLING WAS FORCIBLY TURNED OFF WHILE PRINTING SINCE THE IMAGE ORIENTATION NEEDED TO BE CHANGED IN THE MIDDLE OF THE BUNDLE IN ORDER TO EXECUTE DESIGNATED STAPLING.

THE IMAGE ORIENTATION IS ALIGNED.
PLEASE STAPLE PAPER MANUALLY IF NECESSARY.

PAPER CONVEYANCE DIRECTION →

UPPER-LEFT STAPLING

STAPLER POSITION BACK

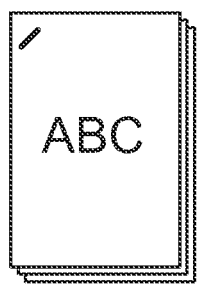

FRONT

ROTATION ANGLE: 0 DEGREE

PAPER CONVEYANCE DIRECTION →

UPPER-RIGHT STAPLING

STAPLER POSITION BACK

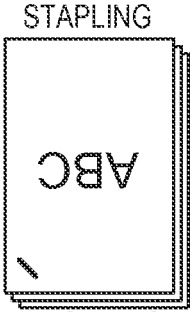

FRONT

ROTATION ANGLE: 180 DEGREES

LOWER-LEFT STAPLING

STAPLER POSITION BACK

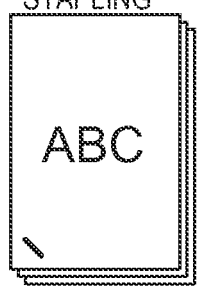

FRONT

ROTATION ANGLE: 0 DEGREE

LOWER-RIGHT STAPLING

STAPLER POSITION BACK

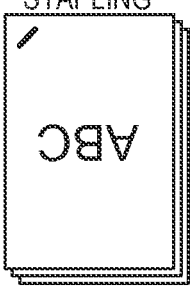

FRONT

ROTATION ANGLE: 180 DEGREES

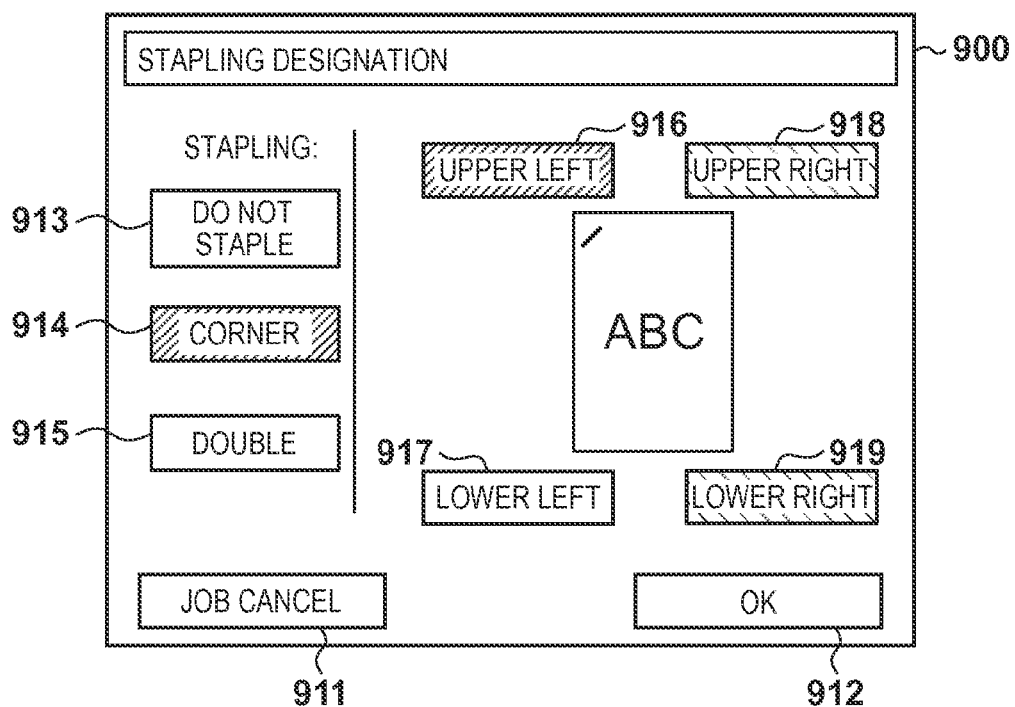
F I G. 12

IMAGE FORMING APPARATUS, PRINT CONTROL METHOD AND STORAGE MEDIUM STORING PROGRAM

BACKGROUND OF THE INVENTION

1. Field of the Invention

The present invention relates to an image forming apparatus, a print control method, and a storage medium storing a program.

2. Description of the Related Art

In recent years, with the advance of various kinds of technology, image forming apparatuses having a variety of functions have been provided. These image forming apparatuses include one having a post-processing function, such as stapling. Moreover, in many cases, these image forming apparatuses have a function of searching for the most appropriate paper feed tray based on various conditions such as a stapling position, an image orientation, and a paper setting direction, rotating an image if necessary, and executing a post-processing function designated by a user as much as possible. That is to say, this function enables a post-processing, which can be performed only at a "certain fixed position" by the apparatus, to be performed at an "any position" based on an input image.

For example, in the case of a stapling device capable of providing a corner binding function at two positions, namely front and back positions with respect to the direction in which an output bundle is discharged, if an image rotation function is not provided, only two binding positions, namely upper and lower left (or right) positions of an output bundle can be designated. However, with the image rotation function, four binding positions, which are upper left, lower left, upper right, and lower right positions can be designated by rotating an image by 180 degrees. Similarly, with a stapling device capable of binding at two positions on the left side, binding at two positions on the right side can also be provided. Waste of paper can be suppressed and operational efficiency can be improved by means of the above-described function (Japanese Patent Laid-Open No. 10-236720).

With a conventional image forming apparatus, even if a user wants to change settings of paper feed and discharge trays or settings of post-processing such as stapling for a remaining output bundle in the middle of an output bundle, the settings of paper feed and discharge trays and the settings of post-processing such as stapling cannot be changed. Furthermore, if the settings are changed in the middle of an output bundle and the stapling position on a latter portion of the bundle is changed to a position different from that on a former portion of the bundle that has already been printed, an image orientation for printing on paper in the latter portion of the bundle needs to be reversed to image orientation for printing on paper in the former portion of the bundle in some cases. In such cases, if printing is simply performed with the orientation of paper in the latter portion of the bundle reversed to the orientation of paper in the former portion of the bundle, opposite image orientations on the former portion of paper and the latter portion of paper are mixed in a finished printed matter. Then, the user will need to take time to change the paper orientation and again align the paper of the entire bundle in the same orientation. Moreover, if the bundle has been stapled, the user will need to take more time to remove the staple and then align the orientation. Under the above-described conditions, an intended printed matter cannot be prepared when stapling printing is executed. Furthermore, although it is also conceivable to perform printing all over again from the first page of the output bundle in order to avoid such a troublesome manual operation, the former portion of the already-printed paper will be wasted in this case.

SUMMARY OF THE INVENTION

An aspect of the present invention is to eliminate the above-mentioned problems with the conventional technology. The present invention provides an image forming apparatus, a print control method, and a storage medium storing a program with which the convenience at the time of executing printing that accompanies a finishing setting is enhanced.

The present invention in its first aspect provide a printing apparatus comprising: a print unit configured to print an image on a sheet; a binding control unit configured to perform control so as to execute binding processing on a plurality of sheets on which the image has been printed by the print unit; an accepting unit configured to, in a case where a job that is set so as to execute the binding processing at a first binding position is being executed and the job is then interrupted, accept a request for changing a position of the binding processing from the first binding position to a second binding position, in a state where the job is interrupted; a determination unit configured to determine whether or not an orientation of a print target image is to be changed in order to change the position of the binding processing from the first binding position to the second binding position in accordance with the request accepted by the accepting unit; and a control unit configured to perform control so as not to execute the binding processing in a case where it is determined by the determination unit that the orientation of the print target image is to be changed.

According to the present invention, the convenience at the time of executing printing that accompanies a finishing setting is enhanced.

Further features of the present invention will become apparent from the following description of exemplary embodiments with reference to the attached drawings.

BRIEF DESCRIPTION OF THE DRAWINGS

FIG. 7 is a diagram showing a processing sequence between the external controller and the image forming apparatus.

FIG. 10 is a diagram showing exemplary warning display that is displayed on the image forming apparatus.

FIG. 11 is a diagram showing exemplary corner stapling modes in the image forming apparatus.

FIG. 12 is a diagram showing exemplary setting prohibition displayed on an operation unit of the external controller.

DESCRIPTION OF THE EMBODIMENTS

Preferred embodiments of the present invention will now be described hereinafter in detail, with reference to the

First Embodiment

Figure 1:
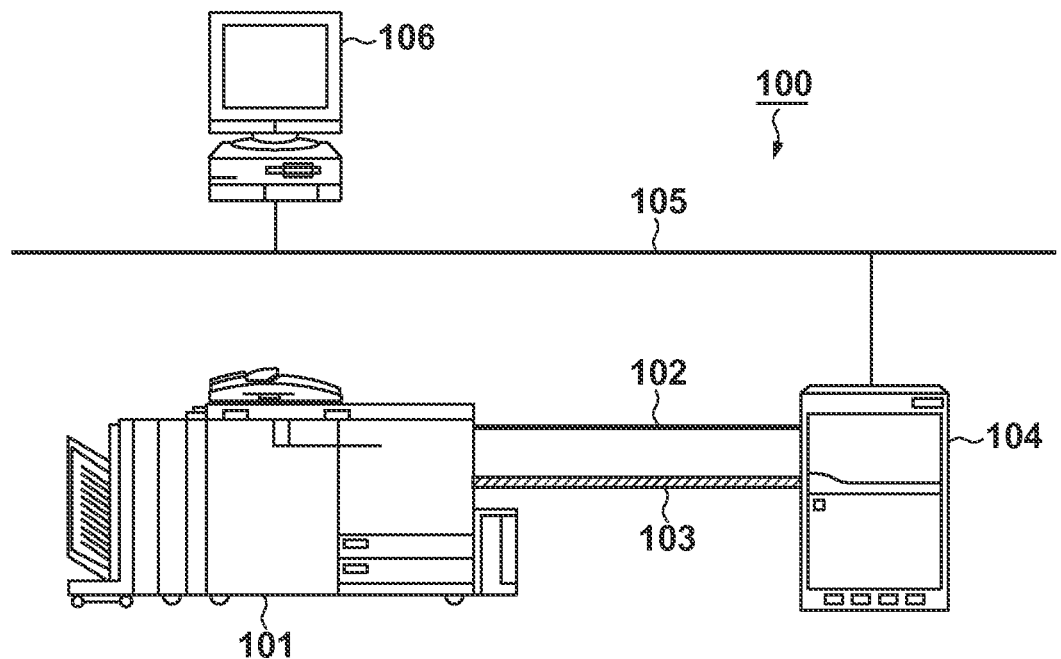
FIG. 1 is a block diagram showing a configuration of an image forming system.

FIG. 1 is a block diagram showing a configuration of an image forming system 100. The image forming apparatus 101 is a color scanner/printer apparatus with which full-color scanning, printing, or the like is possible. In the present embodiment, a finishing setting such as stapling can be configured for multiple pieces of printing paper when performing printing in the image forming apparatus 101. The image forming apparatus 101 is connected to an external controller 104 via an internal network 102 and a video cable 103 for transferring image data. The external controller 104 is connected to an external network 105. A computer terminal 106 such as a general PC is connected to the external network 105. Accordingly, the image forming apparatus 101 is connected to the computer terminal 106 via the external network 105.

Figure 2:
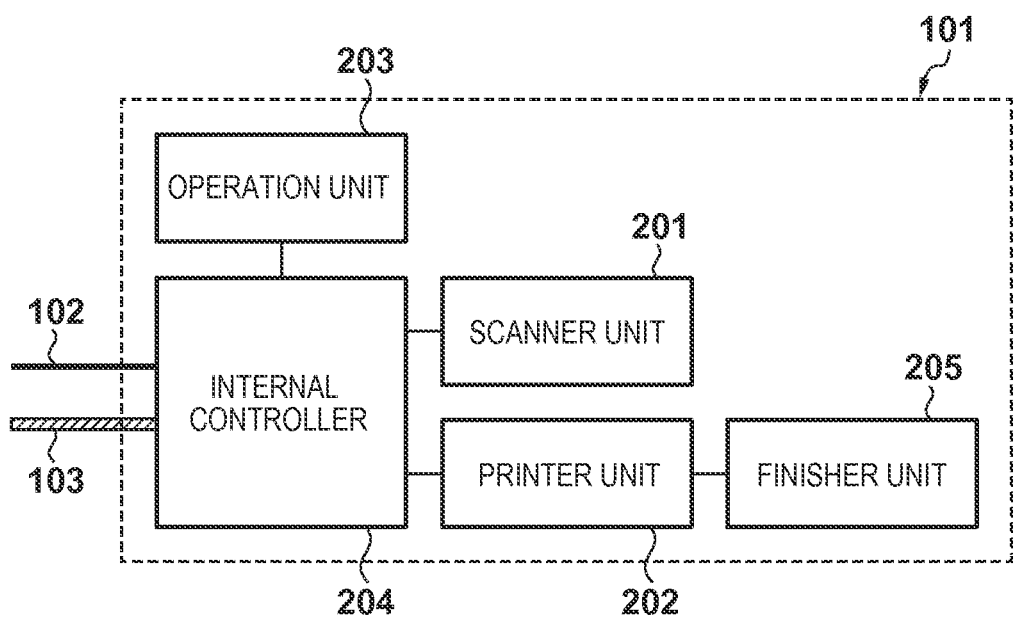
FIG. 2 is a block diagram showing a configuration of an image forming apparatus.

FIG. 2 is a block diagram showing a configuration of an image forming apparatus 101. As shown in FIG. 2, the image forming apparatus 101 has a scanner unit 201 and a printer unit 202, and is equipped with a copy function for printing an image that is read from the scanner unit 201, using the printer unit 202. An operation unit 203 provides a user interface. That is to say, the operation unit 203 has an input unit such as a keyboard or a pointing device with which a user gives an instruction to execute functions of the image forming apparatus 101 or configures operational settings at the time of executing functions. The operation unit 203 also includes a display unit such as a display for notifying a user of the status of the image forming apparatus 101.

An internal controller 204 in the image forming apparatus 101 performs overall operational control, status management, image processing, and the like for the image forming apparatus 101. For example, the internal controller 204 controls operations of the aforementioned scanner unit 201 and printer unit 202, and performs processing regarding a user instruction from the operation unit 203 and a status display thereon. The internal controller 204 also performs processing on image data to be handled in the scanner unit 201 and the printer unit 202, and controls data transmission and reception to and from the external controller 104 connected via the internal network 102. Note that a finisher unit 205 for performing post-processing such as stapling is connected downstream of the printer unit 202. Note that the finisher unit 205 is optional and can be attached to and detached from the image forming apparatus 101.

In the image forming system 100, a document created by a computer is transmitted, as page description language (PDL) data, from the computer terminal 106 to the external controller 104 via the external network 105. The external controller 104 deploys the received PDL data as an image, and generates image data in a format in which the image can be printed by the image forming apparatus 101. The external controller 104 transmits the generated image data to the image forming apparatus 101 via the video cable 103, and communicates various kinds of information regarding operational settings at the time of printing and the image data sent out via the video cable 103, using the internal network 102. The image forming apparatus 101 executes printing based on the image data received from the external controller 104 via the video cable 103 and the various kinds of information received via the internal network 102. Thus, the image forming system 100 realizes a network printer function for printing the PDL data transmitted from the computer terminal 106 via the network, using the image forming apparatus 101.

Configuration of Internal Controller 204

Figure 3:
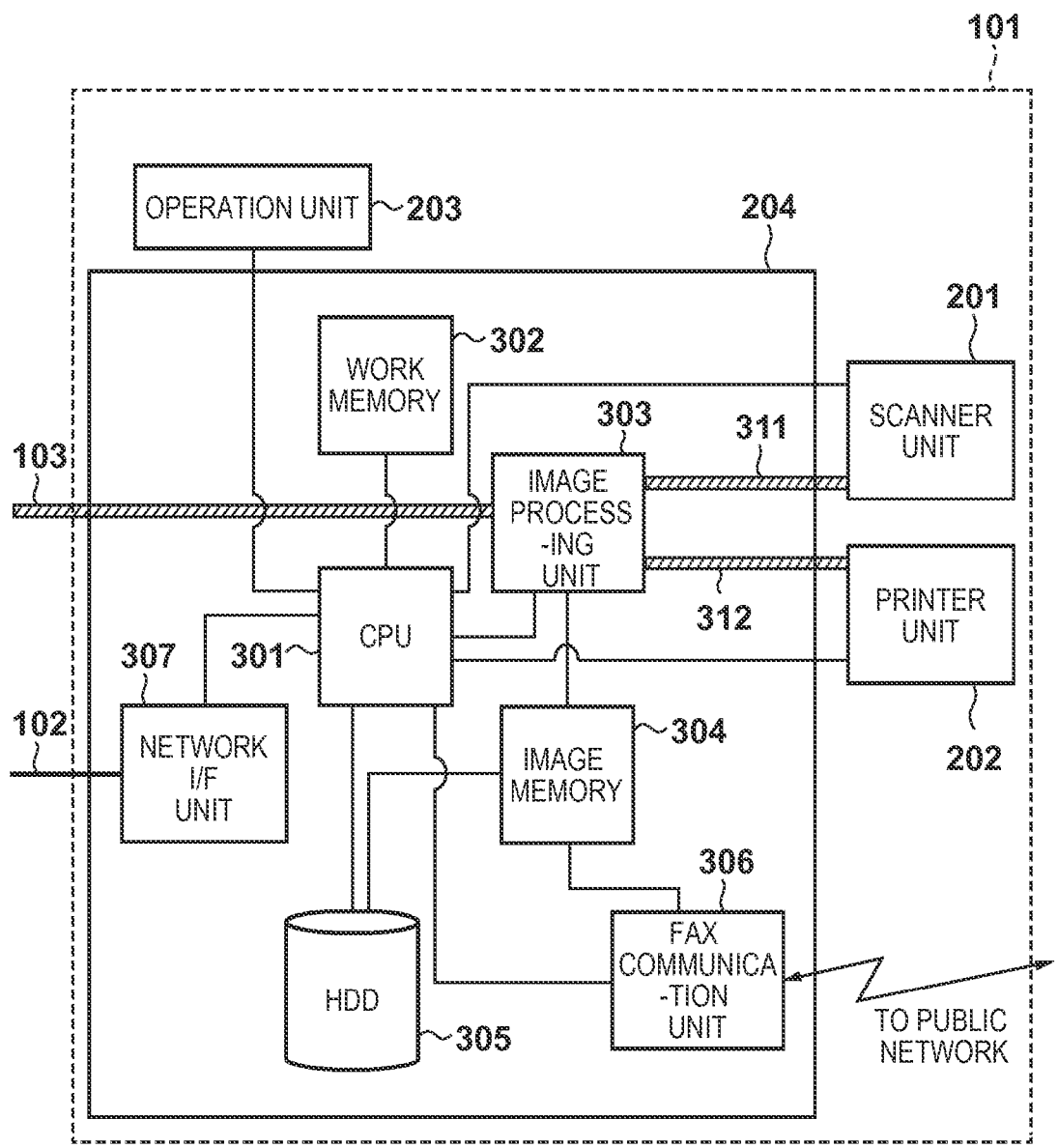
FIG. 3 is a block diagram showing a configuration of an internal controller.

Next, a configuration of the internal controller 204 will be described using FIG. 3. The internal controller 204 includes a CPU 301, a work memory 302, an image processing unit 303, an image memory 304, a mass storage device (HDD) 305, a facsimile (FAX) communication unit 306, and a network I/F unit 307. The image processing unit 303 is connected to the scanner unit 201 and the printer unit 202 via image signal lines 311 and 312, and is also connected to the external controller 104 via the video cable 103. Furthermore, the image processing unit 303 is connected to the image memory 304, and the FAX communication unit 306 is connected to the image memory 304.

Image data that is read by the scanner unit 201 is stored in the HDD 305 via the image processing unit 303 and the image memory 304. The stored image data is again sent out to the printer unit 202 via the image memory 304 and the image processing unit 303 for the purpose of printing. Similarly, image data that is input from the external controller 104 via the video cable 103 is stored in the HDD 305 via the image processing unit 303 and the image memory 304. The stored image data is again sent out to the printer unit 202 via the image memory 304 and the image processing unit 303 for the purpose of printing.

Image data used for facsimile transmission and reception can also be input to and output from the FAX communication unit 306. With the function of storing images in the HDD 305, image data input from the scanner unit 201 or image data input from the external controller 104 via the video cable 103 can be accumulated in the HDD 305 while not being immediately output to the outside. Thus, a so-called box function is realized. With the box function, an image accumulated in the HDD 305 can be printed or faxed in accordance with an instruction from the operation unit 203 when a user wants to print the image or send the image by facsimile, and an image accumulated in the HDD 305 can be shared among a plurality of users.

Furthermore, the image forming system 100 is also equipped with a file transmission function with which an image accumulated in the HDD 305 is sent out to a desired computer terminal connected to the external network 105 and the image is reused in this computer terminal. With this file transmission function, the image processing unit 303 converts the image accumulated in the HDD 305 into an image in a file format (such as Jpeg) that is generally used in computer terminals or the like. The thus-converted file can be sent out to a desired computer terminal via the network I/F unit 307, the internal network 102, the external controller 104, and the external network 105.

The CPU 301 operates in accordance with a program stored in the HDD 305, and also controls the operation unit 203. The CPU 301 also controls processing units within the apparatus, such as the FAX communication unit 306. The CPU 301 also performs communication for achieving synchronization of transmission and reception of image data between the printer unit 202 and the scanner unit 201. Furthermore, the CPU 301 accesses the network I/F unit 307 for communicating with the external controller 104 via the internal network 102.

The internal controller 204 transmits data stored in the HDD 305 to the computer terminal 106 via the internal network 102 and the external controller 104, using a Web service or the like. On the contrary, information from the computer terminal 106 can also be stored in the image memory 304 and the HDD 305 via the internal network 102 and the external controller 104, using a Web service or the like. With the above-described configuration, a remote operation service is realized with which the status of the image forming apparatus 101 can be referenced on the computer terminal 106 and settings of the image forming apparatus 101 can be configured from the computer terminal 106.

Configuration of Printer Unit 202

Figure 4:
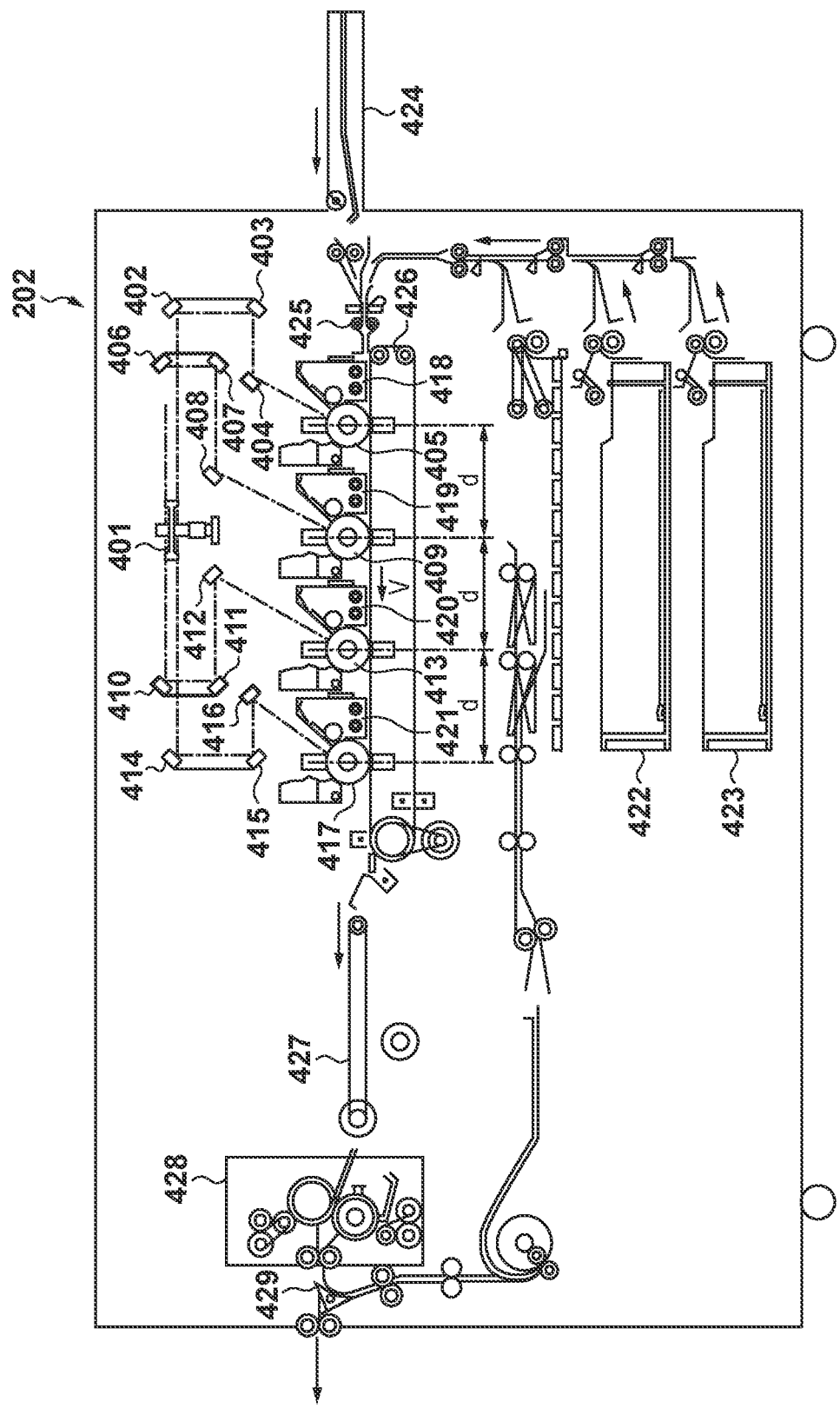
FIG. 4 is an overview diagram showing a printer unit.

FIG. 4 is an overview diagram showing the printer unit 202. A polygon mirror 401 receives four laser beams emitted from a semiconductor laser drive unit. One of these laser beams scans a photosensitive drum 405 through mirrors 402, 403, and 404. Another one of the laser beams scans a photosensitive drum 409 through mirrors 406, 407, and 408. Still another one of the laser beams scans a photosensitive drum 413 through mirrors 410, 411, and 412. The remaining laser beam scans a photosensitive drum 417 through mirrors 414, 415, and 416.

On the other hand, a developing device 418 supplies yellow (Y) toner, develops a latent image formed on the photosensitive drum 405 in accordance with the scanning by the laser beam, and forms a yellow toner image. A developing device 419 supplies magenta (M) toner, develops a latent image formed on the photosensitive drum 409 in accordance with the scanning by the laser beam, and forms a magenta toner image. A developing device 420 supplies cyan (C) toner, develops a latent image formed on the photosensitive drum 413 in accordance with the scanning by the laser beam, and forms a cyan toner image. Furthermore, a developing device 421 supplies black (B) toner, develops a latent image formed on the photosensitive drum 417 in accordance with the scanning by the laser beam, and forms a black toner image. The toner images of the above four colors (Y, M, C, K) are transferred to a sheet, and a full-color output image can be obtained.

A sheet that has been fed from any one of sheet cassettes 422 and 423 and a manual bypass tray 424 passes through registration rollers 425, is then attached on a transfer belt 426 and thus conveyed. The toner of the respective colors is developed in advance on the photosensitive drums 405, 409, 413, and 417 synchronously with the paper feed timing, and the toner is transferred to the sheet with conveyance of the sheet. The sheet to which the toner of these colors has been transferred is separated from the transfer belt 426 and conveyed to a fixing device 428 by a conveyance belt 427. The toner is fixed to the sheet by the fixing device 428. The sheet that has passed through the fixing device 428 is once guided downward by a flapper 429, and is switched back and discharged after the trailing edge of the sheet has passed through the flapper 429. Thus, the sheet is discharged in a face-down state, and a correct page order is achieved when printing is performed in order starting from the top page.

Note that the four photosensitive drums 405, 409, 413, and 417 are disposed at equal intervals of a distance d, and a sheet is conveyed at a constant speed v by the transfer belt 426. The polygon mirror 401 and the semiconductor laser are driven such that the toner images are formed on the photosensitive drums synchronously with a timing appropriate for these positional relationship and conveyance speed.

Configuration of Finisher Unit 205

Figure 5:
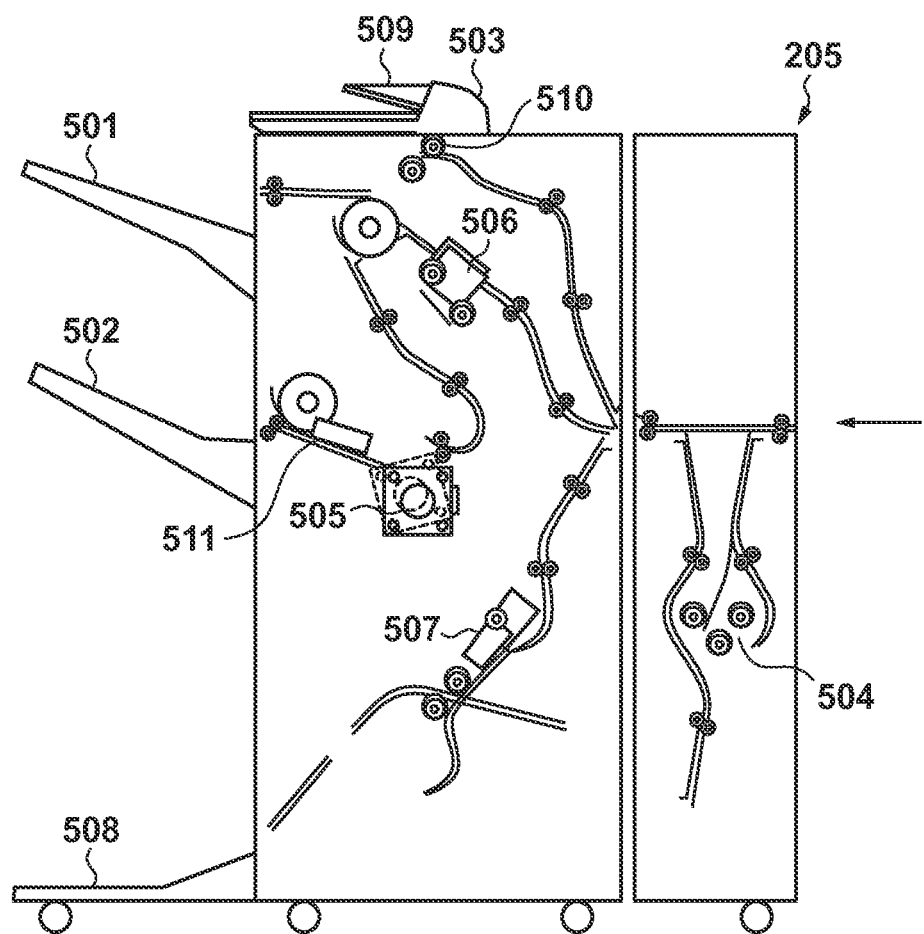
FIG. 5 is an overview diagram showing a finisher unit.

FIG. 5 is an overview diagram showing the finisher unit 205. A sheet discharged through the fixing device 428 in the printer unit 202 enters the finisher unit 205. The finisher unit 205 has a sample tray 501 and a stack tray 502, and the tray to which the sheet is discharged is switched in accordance with the job type or the number of discharged sheets.

There are two sorting methods. The first method is a bin sort method using a plurality of bins for sorting output sheets for each job into a corresponding bin. Another method is a shift sort method using an electronic sort function, which will be described below, for sorting output sheets for each job by shifting a bin (or a tray) in a front-back direction in FIG. 5. The electronic sort function is also called collating. If the internal controller 204 has a large-capacity memory (e.g., image memory 304, HDD 305), an electronic sort function can be supported by means of a so-called collating function with which a buffered page order and discharge order are changed using that memory. Note that a grouping function is a function of sorting sheets by page, as compared to the sorting function with which sheets are sorted by job.

Furthermore, if sheets are discharged to the stack tray 502, sheets before being discharged are kept on an intermediate tray 511, and a sheet bundle of each single set of sheets among multiple sets of sheets or a sheet bundle of sheets for each job is collectively discharged to the stack tray 502. If execution of stapling is designated, stapling is executed by a stapler 505 on a sheet bundle kept on the intermediate tray 511, and the sheet bundle is thereafter discharged to the stack tray 502. In addition, a Z-shape folding device 504 for folding paper in a Z-shape and a puncher 506 for punching two (or three) holes for filing are also provided before reaching the aforementioned two trays, and perform respective processing in accordance with the job type. Furthermore, a saddle stitcher 507 performs processing for creating a booklet such as a weekly or a pamphlet by binding the center part of a sheet at two points and thereafter folding the sheet in half by causing the center part of the sheet to be inserted into rollers. The sheets after undergoing bookbinding at the saddle stitcher 507 are discharged to a booklet tray 508. In addition, although not shown in FIG. 5, finishers for binding by means of gluing for bookbinding, trimming for aligning edges on the side opposite to the bound side after the binding, or the like can also be added.

An inserter 503 is for sending a sheet that is set on a tray 509 to any one of the trays 501, 502, and 508 without through the printer. Thus, the sheet that is set on the inserter 503 can be inserted between sheets to be sent into the finisher unit 205. Sheets to be inserted are set on the tray 509 for the inserter 503 in a face-up state by the user, and are fed into the finisher unit 205 in order starting from the uppermost sheet by a pickup roller 510. Accordingly, sheets are discharged in a face-down state by conveying the sheets from the inserter 503 directly to the tray 501 or 502. Note that in the case of sending recording paper to the saddle stitcher 507, the recording paper is once sent toward the puncher 506 side, and is thereafter switched back and sent out in order to align the face orientation.

External Controller 104

Figure 6:
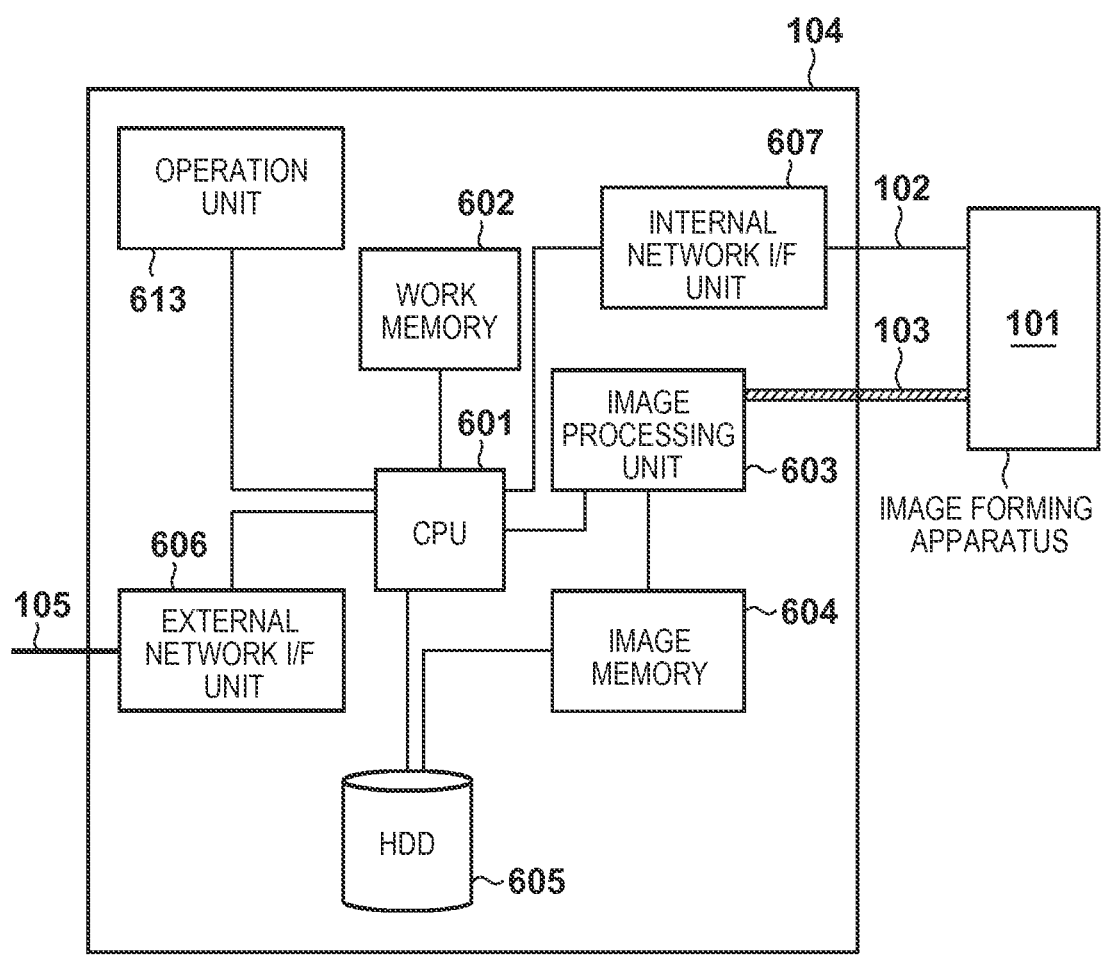
FIG. 6 is a diagram showing a configuration of an external controller.
Figure 8A:
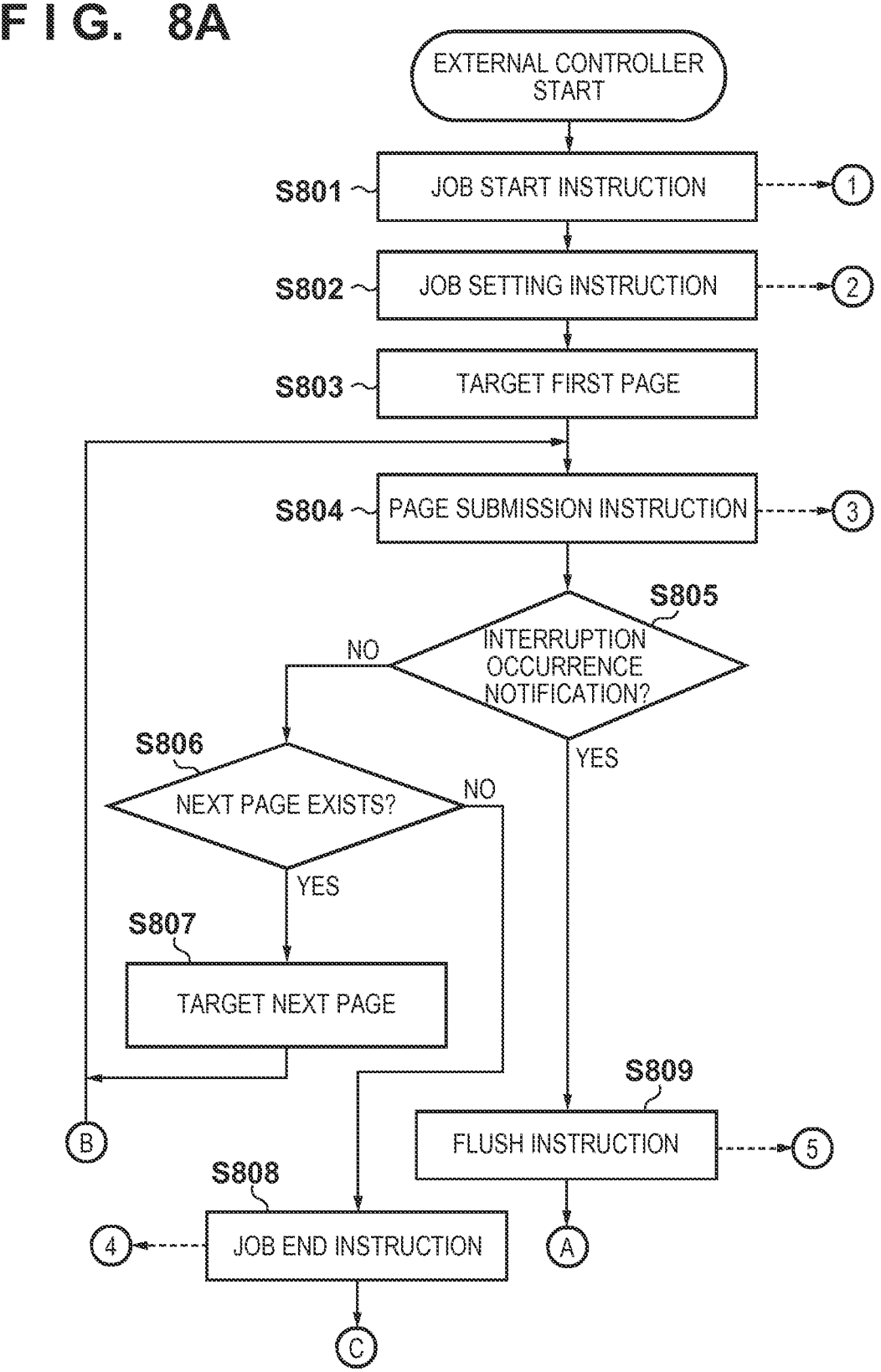
FIGS. 8A-8D are flowcharts showing a processing procedure executed by the external controller and the image forming apparatus.
Figure 8B:
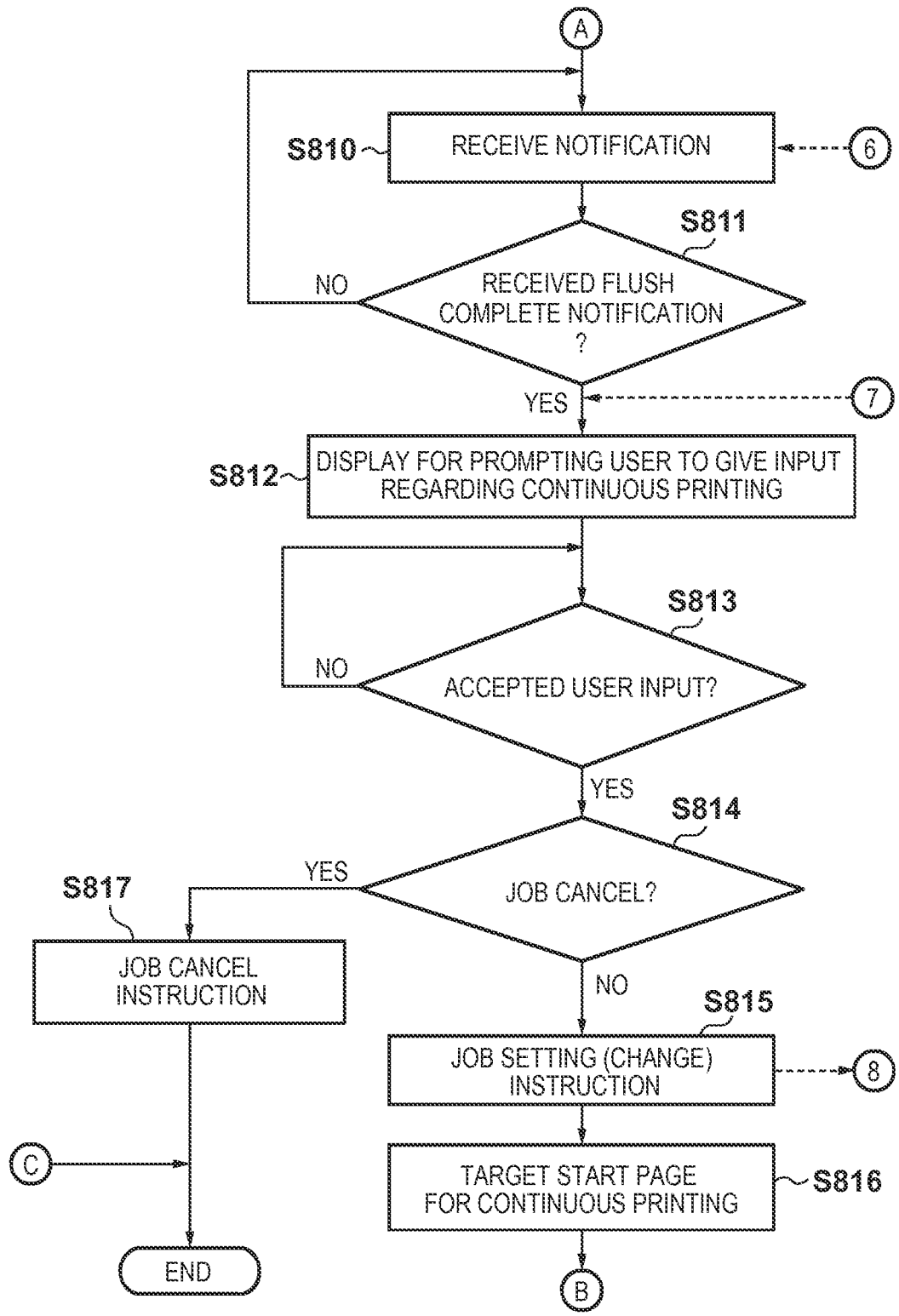
Figure 8C:
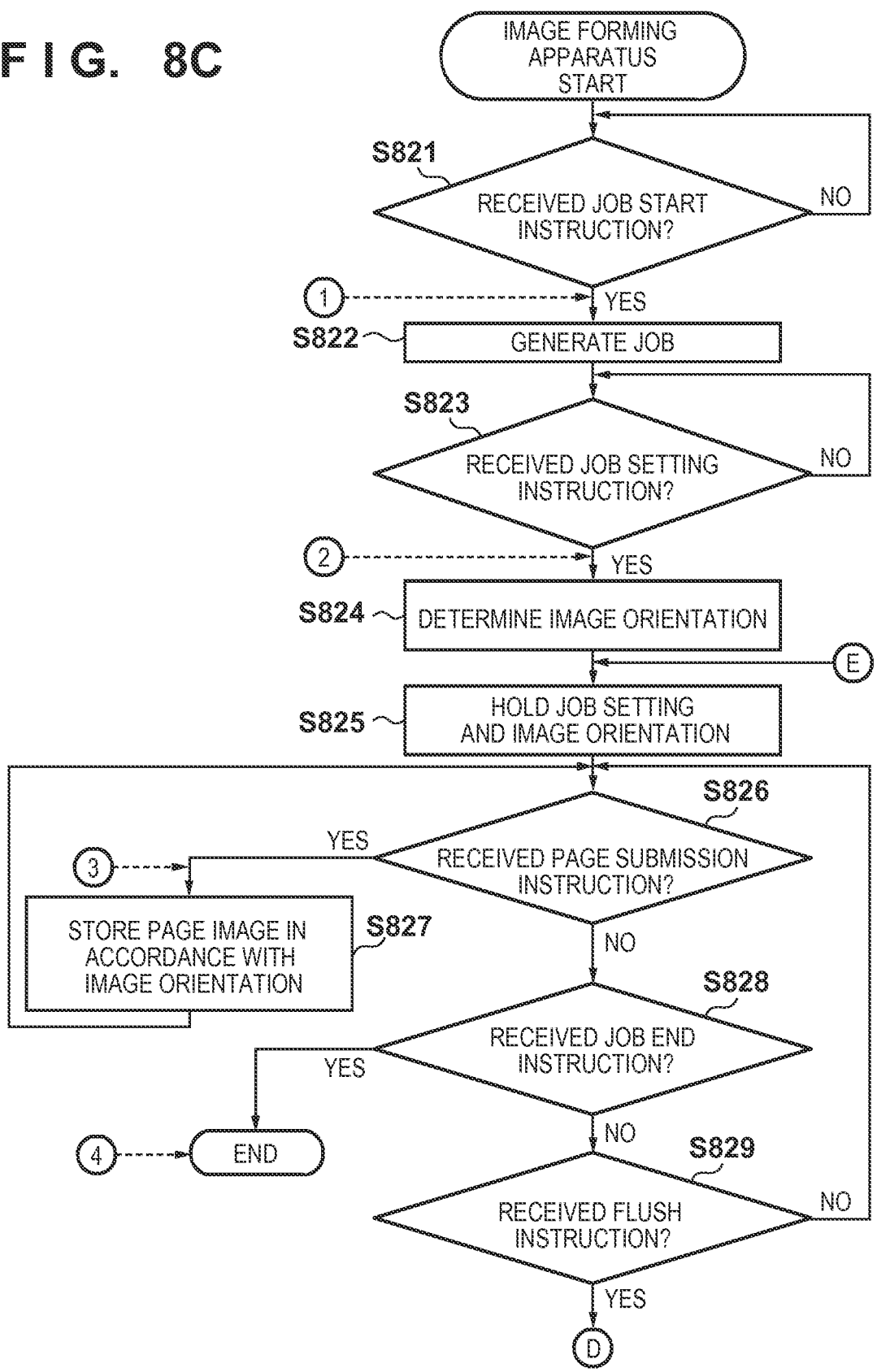
Figure 8D:
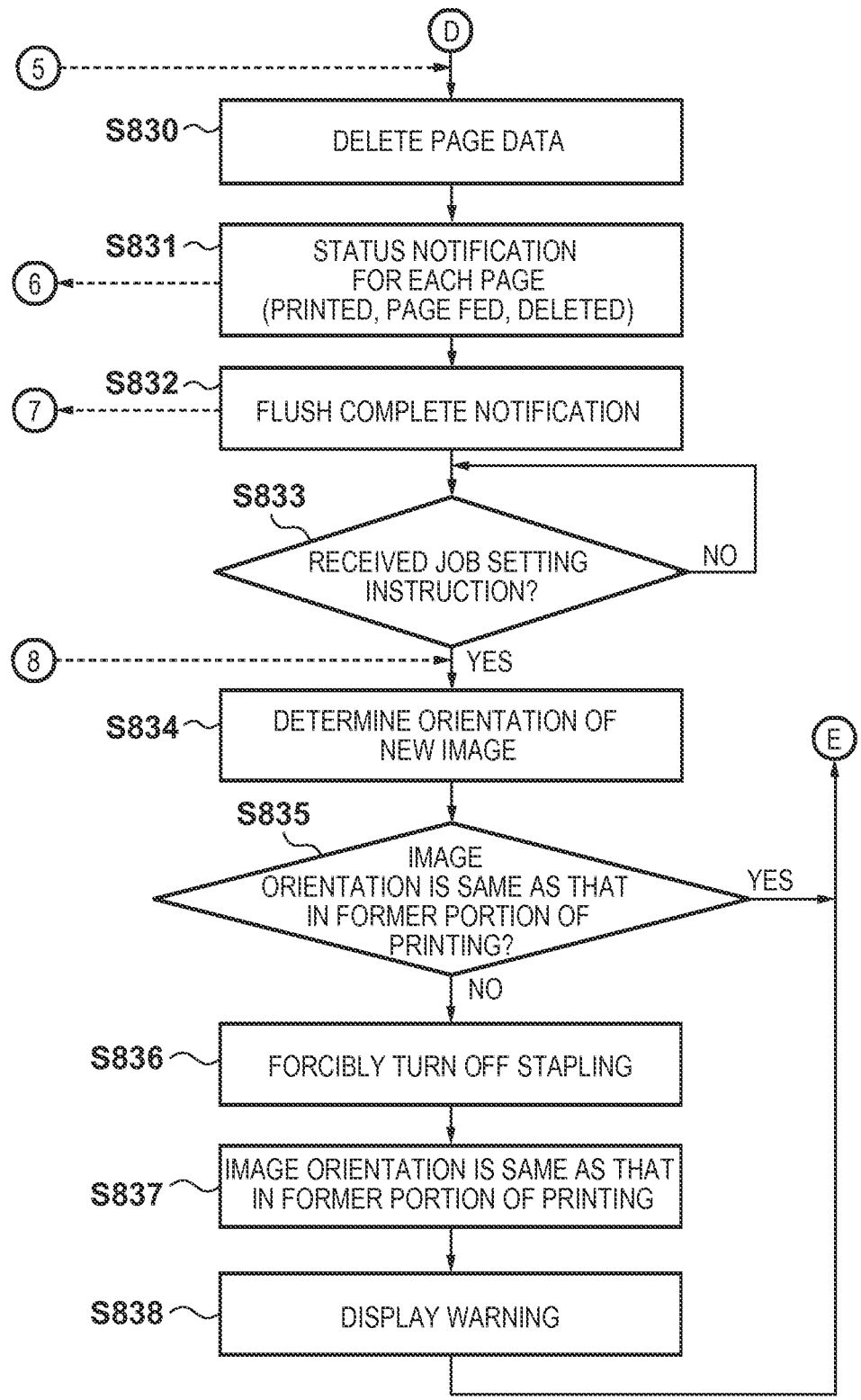

Next, a configuration of the external controller 104 and operations thereof at the time of printing will be described using FIG. 6. The external controller 104 includes a CPU 601, a work memory 602, an image processing unit 603, an image memory 604, a mass storage device (HDD) 605, an external network I/F unit 606, an internal network I/F unit 607, and an operation unit 613. The operation unit 613 provides a user interface. That is to say, the operation unit 613 has an input device with which a user gives an instruction to execute functions of the external controller 104 and configures operational settings at the time of executing functions. The operation unit 613 also includes a display unit such as a display for notifying a user of the status of the external controller 104.

The image processing unit 603 is connected to the image forming apparatus 101 via the video cable 103. The image processing unit 603 is also connected to the image memory 604. The external network I/F unit 606 is connected to the external network 105, and the internal network I/F unit 607 is connected to the internal network 102. The CPU 601 operates in accordance with a program stored in the HDD 605, communicates with the computer terminal 106 and the image forming apparatus 101 via the network I/F units 606 and 607, and executes predetermined processing. The CPU 601 also performs processing regarding a user instruction from the operation unit 203 and a status display thereon.

Subsequently, operations (control by the CPU 601) in the external controller 104 when printing a document file in the computer terminal 106 will be described. The external controller 104 receives, via the external network 105, PDL data transmitted from the computer terminal 106 using the external network I/F unit 606. The PDL data received by the external network I/F unit 606 is accumulated in the HDD 605. Next, the CPU 601 deploys the PDL data accumulated in the HDD 605 as an image in the image memory 604, using the image processing unit 603. Then, the image processing unit 603 transfers the deployed image to the image forming apparatus 101 via the video cable 103. At this time, the CPU 601 transmits print attribute information regarding the deployed image to the image forming apparatus 101 via the internal network I/F unit 607 and the internal network 102. Note that the print attribute information includes information such as the size of the deployed image, settings included in the PDL data at the time of printing performed by the image forming apparatus 101, and the like. Thus, the image forming apparatus 101 prints the image on a sheet (recording medium) based on the print attribute information transmitted from the external controller 104 and the deployed image.

Schematic Sequence for Job Submission (Including Flushing Operation)

Next, an exemplary schematic sequence of processing for job submission including an operation of a flushing function, which is characteristic in the present embodiment, will be described using FIG. 7. FIG. 7 shows an exemplary processing sequence performed by the external controller 104 and the image forming apparatus 101 in FIG. 1 via the internal network 102.

FIG. 7 is a sequence in the case where an instruction to submit page data for a four-page print job is given. The image forming apparatus 101 stores the page data for the received print job in the HDD 305, and executes printing based on the stored page data. If the print job includes page data of multiple pages, the image forming apparatus 101 executes printing based on the page data of multiple pages. In the image forming apparatus 101, discharge of a first-page sheet to the intermediate tray 511 has been completed, and after a second-page sheet is fed, a job interruption factor has occurred before discharge of the second-page sheet to the intermediate tray 511 is completed. This job interruption factor is a jam error or running-out of paper, for example. After the job interruption occurs in the image forming apparatus 101, a flush instruction is given from the external controller 104. Upon receiving this flushing instruction, the image forming apparatus 101 deletes all page data for the job. That is to say, flushing processing in this example is processing for deleting page data for the job that exists in the image forming apparatus 101 and for which printing is being executed. After the page data for which printing is being performed is deleted, the user can change job settings and give a sample print instruction based on the changed settings, from the external controller 104. Thereafter, the external controller 104 again transmits the page data of second to fourth pages together with the job settings to the image forming apparatus 101, in accordance with a user instruction.

FIG. 7 indicates that processing is executed in order from the uppermost step (S701) toward the lowermost step (S719). The processing indicated by arrows indicates that the arrow base side gives an instruction or a notification to the arrow head side. Initially, in step S701, the external controller 104 gives a job start instruction to the image forming apparatus 101, and a job #1 is generated in the image forming apparatus 101.

Then, in step S702, the external controller 104 gives a job setting instruction to the image forming apparatus 101. Here, an instruction to configure operational settings for printing performed by the image forming apparatus 101 is given. The job settings include settings regarding whether to perform stapling processing, stapling positions, and the like. In this example, an instruction to configure a setting for stapling at the upper left (TopLeft) position is included. In subsequent steps S703 to S706, page submission instructions are given from the external controller 104 to the image forming apparatus 101. Here, page submission is performed four times, and thus, that four pages, namely the page #1 to a page #4 are submitted to the image forming apparatus 101.

Thereafter, in step S707, a job interruption occurrence notification is given from the image forming apparatus 101 to the external controller 104. In FIG. 7, the external controller 104 is notified that some kind of job interruption factor such as a jam or running-out of paper has occurred in the image forming apparatus 101. In step S708, a flushing instruction is given from the external controller 104 to the image forming apparatus 101. This flushing instruction corresponds to an instruction transmitted to the image forming apparatus 101 in step S809 in FIGS. 8A-8D, which will be described later. In the present embodiment, the external controller 104 is configured to give the flushing instruction upon receiving the job interruption occurrence notification from the image forming apparatus 101. Note that the timing of the external controller 104 giving the flushing instruction is not limited to the timing of receiving the job interruption occurrence notification. For example, the flushing instruction may also be given from the external controller 104 to the image forming apparatus 101 in accordance with user input to the external controller 104.

In steps S709 to S712, page status notifications are given from the image forming apparatus 101 to the external controller 104. Here, the notification is given four times so as to give notification of the status of each of the four pages submitted in steps S703 to S706 for the job #1 started based on the job start instruction in step S701 (corresponding to step S831 in FIGS. 8A-8D). The status of each page is any one of "printed", "paper fed", and "deleted". "Printed" indicates a state in which the page has been printed and discharge of the page to a discharge destination such as the intermediate tray 511 in the finisher unit 205 has been completed. "Paper fed" indicates a state in which the page has been fed from any one of paper feed destinations such as the sheet cassettes and the manual bypass tray but discharge of the page to the discharge destination has not been completed. "Deleted" indicates a state in which the page data has been deleted before the corresponding page is fed (deletion of page data corresponds to step S830 in FIGS. 8A-8D).

In step S709, a notification that the page #1 has been printed is given, and in step S710 a notification that the page #2 has been fed but discharge thereof has not been completed is given. That is to say, it is indicated that the page #2 remains in the image forming apparatus 101. In steps S711 and S712, notifications that the page #3 and the page #4 have been deleted are given, respectively. In step S713, a flushing complete notification is given from the image forming apparatus 101 to the external controller 104. That is to say, a notification that a series of flushing processing has been completed is given.

In step S714, a job setting instruction is given from the external controller 104 to the image forming apparatus 101. This is an instruction similar to that in step S702. In this example, an instruction to configure a setting for stapling at the upper right (TopRight) position is included. That is to say, the staple setting is changed from the upper left (TopLeft) position to the upper right (TopRight) position.

In steps S715 to S717, page submission instructions are given from the external controller 104 to the image forming apparatus 101. Here, page submission is performed three times, and thus, three pages, namely the page #2 to the page #4 are submitted to the image forming apparatus 101. This means that latter three pages are submitted that has not been printed among the four pages, namely the page #1 to the page #4 submitted in steps S703 to S706, in accordance with a user instruction.

With the above-described sequence, a printout of the four pages, namely the page #1 to the page #4 is discharged in the image forming apparatus 101. In step S718, a job end instruction is given from the external controller 104 to the image forming apparatus 101, and in step S719, a job end notification is given from the image forming apparatus 101 to the external controller 104.

Job Submission Flow (Including Flushing Instruction and Subsequent Continuous Printing Instruction)

Next, a job submission operation of the external controller 104 will be described using steps S801 to S817 in FIGS. 8A-8D. Processing in steps S801 to S817 shown in FIGS. 8A-8D is job submission processing executed by the external controller 104. The processing includes a flushing instruction and subsequent continuous printing processing. The processing in these steps is realized by the CPU 601 in the external controller 104 loading a control program stored in the HDD 605 onto the work memory 602 and executing the control program.

Initially, in step S801, the external controller 104 transmits the job start instruction to the image forming apparatus 101 (corresponding to step S701 in FIG. 7). In step S802, the external controller 104 transmits the job setting instruction to the image forming apparatus 101 (corresponding to step S702 in FIG. 7). In step S803, the external controller 104 targets the first page. In step S804, the external controller 104 transmits the page submission instruction for the target page to the image forming apparatus 101. In step S805, the external controller 104 determines whether or not the external controller 104 has received the interruption occurrence notification from the image forming apparatus 101. If it is determined here that the external controller 104 has not received the interruption occurrence notification, in step S806 the external controller 104 determines whether or not a next page of the target page exists. If it is determined here that a next page exists, in step S807 the external controller 104 targets the next page and repeats the processing in step S804 and subsequent steps. Thus, the first and subsequent pages are transmitted to the image forming apparatus 101 (corresponding to steps S703 to S706 in FIG. 7).

On the other hand, if it is determined in step S806 that a next page does not exist, it means that transmission of the page submission instructions for all pages to the image forming apparatus 101 has been finished. Then the external controller 104 advances the processing to step S808, and transmits the job end instruction to the image forming apparatus 101 and completes a series of processing.

If it is determined in step S805 that the external controller 104 has received the interruption occurrence notification, in step S809 the external controller 104 transmits the flushing instruction to the image forming apparatus 101 (corresponding to step S708 in FIG. 7). In step S810, the external controller 104 accepts the page status notification from the image forming apparatus 101. The content of the received notification is stored in the work memory 602 or the HDD 605 so as to be able to be referenced when necessary.

In step S811, the external controller 104 determines whether or not the external controller 104 has received the flushing complete notification from the image forming apparatus 101 (corresponding to step S713 in FIG. 7). If it is determined that the external controller 104 has not received the flushing complete notification, the external controller 104 returns the processing to step S810 and repeats the processing until it is determined in step S811 that the external controller 104 has received the flushing complete notification.

On the other hand, if it is determined in step S811 that the external controller 104 has received the flushing complete notification from the image forming apparatus 101, the external controller 104 advances the processing to step S812. In step S812, the external controller 104 performs display for prompting the user to give input regarding "continuous printing" on the operation unit 613. The display for prompting the user to give input regarding "continuous printing" will be described later.

In step S813, the external controller 104 determines whether or not the external controller 104 has finished accepting user input regarding continuous printing. As described later, if either a print key 902 or a job cancel key 901 is pressed, it is determined that the external controller 104 has finished accepting user input.

Here, step S813 is repeated until it is determined that the external controller 104 has finished accepting input. If it is determined in step S813 that the external controller 104 has finished accepting input, the external controller 104 advances the processing to step S814. In step S814, the external controller 104 determines whether or not the user has input "job cancel". If it is determined that the user has input "job cancel", the external controller 104 advances the processing to step S817. In step S817, the external controller 104 transmits a job cancel instruction to the image forming apparatus 101. Then the external controller 104 ends a series of processing.

On the other hand, if it is determined in step S814 that the user has not input "job cancel", i.e., the user has input "continue printing", the external controller 104 advances the processing to step S815. In step S815, the external controller 104 transmits the job setting instruction to the image forming apparatus 101 (corresponding to step S714 in FIG. 7). Here, an instruction to configure settings regarding whether to perform stapling and the stapling position that is input by the user through a display screen for operational settings for stapling, which will be described later using FIG. 9 is also transmitted.

In step S816, the external controller 104 targets a start page for continuous printing that is input by the user. This is the page that has been input by the user on the input screen for continuous printing in aforementioned step S813. Then the external controller 104 returns the processing to step S804 and repeats the processing from transmission of the page submission instruction for the target page to the image forming apparatus 101. Thus, the start page and subsequent pages for continuous printing input by the user are transmitted to the image forming apparatus 101 (corresponding to steps S715 to S717 in FIG. 7).

On the other hand, if it is determined in step S814 that the user has input "job cancel", in step S817 the external controller 104 transmits the job cancel instruction to the image forming apparatus 101. The image forming apparatus 101 that has received the job cancel instruction cancels the job and ends the processing. Then the external controller 104 completes a series of job submission processing.

As described above, if the external controller 104 receives the interruption occurrence notification when submitting a job, the external controller 104 gives the flushing instruction to the image forming apparatus 101. After completing the flushing processing in the image forming apparatus 101, the external controller 104 operates so as to transmit settings regarding stapling or the like and pages to be continuously printed to the image forming apparatus 101, in accordance with the input accepted from the user.

Print Operation Flow

Next, a print control operation in the image forming apparatus 101 will be described using steps S821 to S838 in FIGS. 8A-8D. Processing in steps S821 to S838 shown in FIGS. 8A-8D is executed by the internal controller 204 in the image forming apparatus 101. More specifically, for example, the processing is realized by the CPU 301 in the internal controller 204 loading a control program stored in the HDD 305 onto the work memory 302 and executing the control program.

Initially, in step S821, the internal controller 204 determines whether or not the internal controller 204 has received the job start instruction. Here, step S821 is repeated until it is determined that the internal controller 204 has received the job start instruction. If it is determined in step S821 that the job start instruction has been received, in step S822 the internal controller 204 generates a new job.

In step S823, the internal controller 204 determines whether or not the internal controller 204 has received the job setting instruction. Here, step S823 is repeated until it is determined that the internal controller 204 has received the job setting instruction. If it is determined in step S823 that the internal controller 204 has received the job setting instruction, in step S824 the internal controller 204 determines the image orientation to be handled in the printing processing, based on the received job setting. For example, it is determined whether the received image data is to be printed as-is or it is necessary to perform printing after performing image rotation processing to change the orientation. This determination is made in the case where a setting for performing stapling is configured, based on whether the set stapling position is a position at which stapling can be performed without changing the orientation, in terms of the mechanism of the stapling device. In step S825, the internal controller 204 holds, as information regarding the job, the received job setting and the image orientation resulting from the determination.

In step S826, the internal controller 204 determines whether or not the internal controller 204 has received the page submission instruction. Here, if it is determined in step S826 that the internal controller 204 has received the page submission instruction, in step S827 the internal controller 204 stores a page image in the orientation conforming to the held image orientation. For example, the image processing unit 303 performs necessary rotation processing on the input image data such that the orientation of the input image data conforms to the held image orientation, and thereafter stores the input image data in the HDD 305. Then the internal controller 204 returns the processing to step S826. On the other hand, if it is determined in step S826 that the internal controller 204 has not received the page submission instruction, in step S828 the internal controller 204 determines whether or not the internal controller 204 has received the job end instruction. Here, if it is determined that the internal controller 204 has received the job end instruction, the internal controller 204 completes a series of processing.

On the other hand, if it is determined in step S828 that the internal controller 204 has not received the job end instruction, in step S829 the internal controller 204 determines whether or not the internal controller 204 has received the flushing instruction. Here, the flushing instruction is the instruction transmitted by the external controller 104 to the image forming apparatus 101 in aforementioned step S809.

If it is determined in step S829 that the internal controller 204 has received the flushing instruction, in step S830 the internal controller 204 deletes all page data for the job. Then, in step S831, the internal controller 204 transmits the status of each page to the external controller 104.

After the notification of the status of each page has been finished in step S831, the internal controller 204 advances the processing to step S832 and transmits the flushing complete notification to the external controller 104. Upon the external controller 104 receiving the flushing complete notification, the external controller 104 advances the processing from step S811 to step S812, as described above. In step S833, the internal controller 204 determines whether or not the internal controller 204 has received the job setting instruction. Here, step S833 is repeated until it is determined that the internal controller 204 has received the job setting instruction. If it is determined in step S833 that the internal controller 204 has received the job setting instruction, the internal controller 204 advances the processing to step S834. In step S834, the internal controller 204 determines the orientation of a new image, based on the received job setting. This determination is processing similar to that in step S824. In step S835, the internal controller 204 determines whether the orientation of the new image is the same as the held image orientation in a former portion of printing.

If the internal controller 204 determines in step S835 that the orientation of the new image is the same as the image orientation in the former portion of printing (i.e., the image orientation before the setting is changed), the internal controller 204 returns the processing to step S825, and continues the processing from overwriting the job setting and the image orientation as job information and holding this job information. That is to say, consequently, the image orientation does not change in the output. In this case, the internal controller 204 performs control such that a sheet bundle stacked in the intermediate tray 511 is stapled by the stapler 505 after the completion of printing of a single set of page data or printing of page data for a single job. Then the internal controller 204 performs control such that the stapled sheet bundle is discharged to the stack tray 502.

On the other hand, if the internal controller 204 determines in step S835 that the orientation of the new image is not the same as the image orientation in the former portion of printing, in step S836 the internal controller 204 configures a setting so as to forcibly turn off stapling (such that stapling is not performed). In step S837, the internal controller 204 does not change the image orientation from the orientation in the former portion of printing. In this case, the internal controller 204 performs control such that the sheet bundle stacked in the intermediate tray 511 is not stapled by the stapler 505 after completion of printing of a single set of page data or printing of page data for a single job. Then the internal controller 204 performs control such that the sheet bundle stacked in the intermediate tray 511 is discharged to the stack tray 502 without being stapled. In step S838, the internal controller 204 displays, on the operation unit 203, a warning for notifying the user that "the printout has not been stapled while the orientation thereof has been aligned". For example, the display shown in FIG. 10 is performed. Then the processing returns to step S825, and is continued from overwriting the received job setting and the image orientation (the same orientation as that in the former portion of printing) as job information and holding this job information. That is to say, consequently, the image orientation does not change in the output.

As described above, the image forming apparatus 101 performs the flushing processing on each job in the image forming apparatus, in accordance with the flushing instruction from the external controller 104. The flushing processing is processing for performing operations such that the page data of the job is deleted, while a job is continued without being cancelled. Then the image forming apparatus 101 determines the image orientation to be handled in the printing processing, in accordance with the staple setting at the time of continuous printing. If the orientation of this image is different from the image orientation in the former portion of printing, the setting is forcibly changed such that stapling is turned off (not performed), and a restriction is placed on the latter continuous printing such that the printing is performed without changing the image orientation from that in the former portion of printing.

Display for Prompting User to Give Input

Figure 9A:
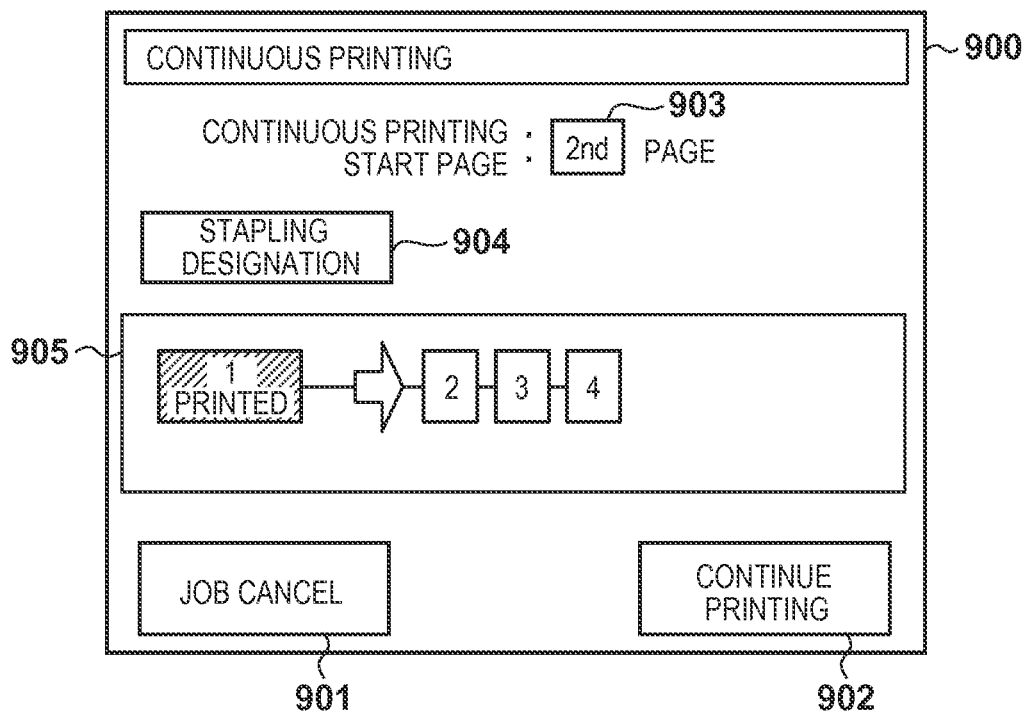
FIGS. 9A and 9B are diagrams showing a display with which the external controller prompts a user to give input regarding "continuous printing".

Next, the display with which the external controller 104 prompts the user to give input regarding "continuous printing" will be described using FIGS. 9A and 9B. FIG. 9A is an exemplary screen displayed on the operation unit 613 with which the external controller 104 prompts the user to give input regarding "continuous printing". Here, a start page field 903 for continuous printing indicates which page the continuous printing is started in the case where a "continue printing" key 902 is pressed. The user can change a value in the start page field 903 for continuous printing. FIG. 9A shows an exemplary display in the case of starting the continuous printing from the second page.

Figure 9B:
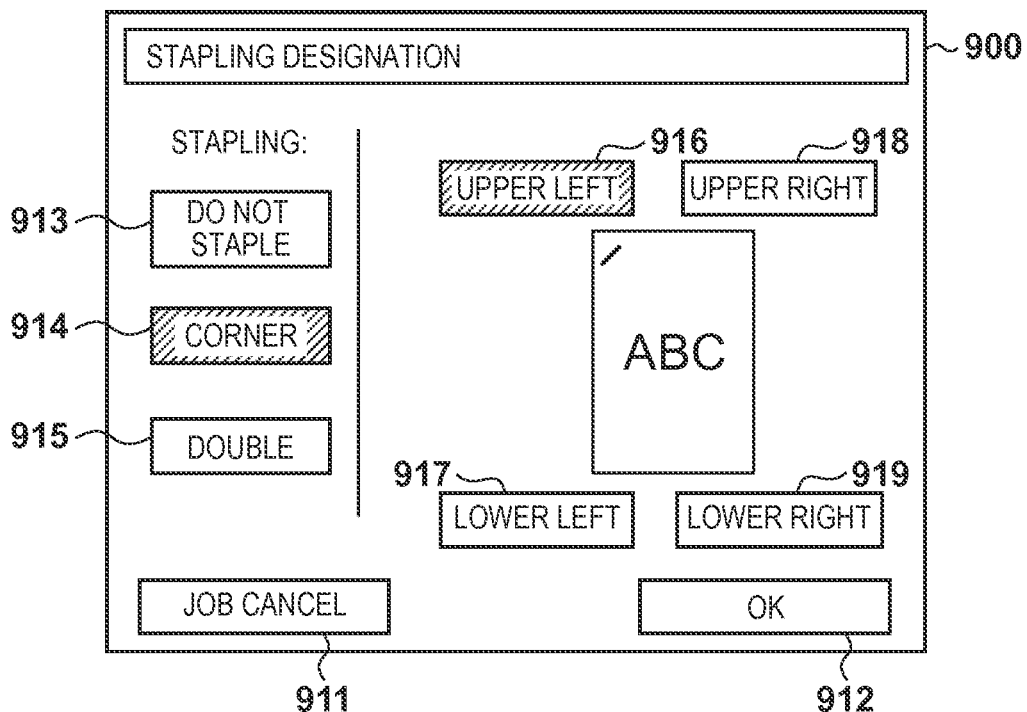

Here, upon a stapling designation key 904 being pressed, the display transitions to the screen in FIG. 9B, where settings regarding stapling can be configured. Whereas, upon a job cancel key 901 being pressed, the job cancel instruction is communicated from the external controller 104 to the image forming apparatus 101 (corresponding to step S817 in FIGS. 8A-8D). Upon the "continue printing" key 902 being pressed, the external controller 104 performs continuous printing processing in accordance with the value set in each field. Note that if either the "continue printing" key 902 or the job cancel key 901 is pressed, it means that input regarding the continuous printing is completed and the user input has finished being accepted.

Next, FIG. 9B is an exemplary screen that the external controller 104 displays on the operation unit 613 in order to prompt the user to give input regarding "stapling designation". Upon a stapling designation key 904 in FIG. 9A being pressed, the display transitions to the stapling designation screen in FIG. 9B.

In FIG. 9B, a setting can be configured such that stapling is not performed, by pressing a "do not staple" select key 913. Whereas, a corner stapling mode for performing processing for stapling at a single position on a corner of an output bundle is selected by pressing a corner select key 914, and an upper left key 916, a lower left key 917, an upper right key 918, and a lower right key 919 are displayed. As a result of pressing one of these keys, the stapling position can be set to one of the upper left corner, the lower left corner, the upper right corner, and the lower right corner of the output bundle. Upon a double select key 915 being pressed, a double-stapling mode for performing processing for stapling at two positions on a single side of an output bundle is selected, and a left-side two-position binding key and a right-side two-position binding key (not shown) are displayed. As a result of pressing one of these binding keys, the stapling position for an output bundle can be set to either the left-side two-position binding or the right-side two-position binding.

In the example in FIG. 9B, upper-left stapling is selected. The user can also change the setting of the stapling position to a desired stapling position. The user validates the set content on the screen in FIG. 9B using an OK key 912, and invalidates the set content on the screen in FIG. 9B using a cancel key 911. In any case, the display returns to the screen in FIG. 9A.

FIG. 11 is a schematic diagram showing an exemplary method for realizing the respective corner stapling modes in the image forming apparatus 101. In the image forming apparatus 101, the finisher unit 205 is provided with a stapler 505, and this stapler 505 is configured to be able to move to the back side and the front side in the vertical direction with respect to the sheet conveyance direction. As shown in FIG. 11, upper-left stapling and lower-left stapling are realized by changing the stapling position respectively to the aforementioned back side and front side. On the other hand, since upper-right stapling and lower-right stapling cannot be realized without image rotation, the image is rotated by 180 degrees using the image rotation processing, and furthermore, the stapling position is changed respectively to the aforementioned back side and front side, thereby realizing the upper-right and lower-right stapling.

In the case of the sequence in FIG. 7, in step S812 in FIGS. 8A-8D, the external controller 104 performs an initial display as shown in FIG. 9A on the operation unit 613 to prompt the user to give input. The user can input a desired setting regarding continuous printing by performing the above-described operation. Note that the initially displayed page here is not limited to this example, and any kind of page may be displayed. In this example, since only the page #1 has been printed according to the page status notification from the image forming apparatus 101, the page #2, which is the top page among the pages that have not been printed, is initially displayed in the start page field 903 for continuous printing. A field 905 schematically displays the page to be printed if the "continue printing" key 902 is pressed. Here, it is indicated that the page #2 and subsequent pages are subjected to continuous printing. That is to say, if the "continue printing" key 902 is pressed on the screen in FIG. 9A, the instructions are given from the external controller 104 to the image forming apparatus 101 in steps S714, S715, S716, and S717 in this order, as shown in the sequence in FIG. 7. For example, if the user wants to change the start page for continuous printing to the page #3, the value in the start page field 903 for continuous printing need only be changed to "3".

As described above, if the image orientation on discharged paper in a former portion of printing is different from the image orientation in a latter portion of printing after a setting change due to the setting change instruction given in the middle of an output bundle, the image forming apparatus 101 performs control such that the image orientation in the latter portion of printing is the same as that in the former portion of printing and stapling processing is not performed. Thus, generation of a printed matter in which different image orientations are mixed in the entire bundle can be avoided.

Second Embodiment

The first embodiment has described an example in which an instruction to change the stapling position setting to an any desired stapling position for the user can be given from the external controller 104 to the image forming apparatus 101. However, the setting change to the stapling position at which the image rotation processing is needed in the image forming apparatus 101 may be prohibited in advance by the external controller 104. The configuration thereof will now be described. Note that the configuration of the image forming apparatus 101 is the same as that in the first embodiment.

This configuration is realized by performing processing in which the external controller 104 prohibits a stapling position setting that requires image rotation different from image rotation during the former portion of printing, in step S812 in FIGS. 8A-8D.

A description thereof will be given below using FIG. 12. FIG. 12 is a schematic view showing an exemplary setting screen that realizes setting prohibition in the operation unit 613 in the external controller 104. FIG. 12 corresponds to the stapling designation screen shown in FIG. 9B, and the same portions as those in FIG. 9B are given the same reference numerals.

For example, if the upper-left stapling position (rotation angle: 0 degree) is designated for the former portion of printing, setting keys 918 and 919 respectively for the upper-right corner stapling and the lower-right corner stapling, with which the rotation angle is 180 degrees (different from the rotation angle in the former portion of printing), are shaded in the display such that these corner stapling positions cannot be set, as shown in FIG. 12. The lower-left corner stapling, with which the rotation angle is 0 degree as in the former portion of printing, is displayed so as to be able to be set. Similarly, if the upper-right stapling position (rotation angle: 180 degrees) is designated for the former portion of printing, setting keys 916 and 917 respectively for the upper-left corner stapling and the lower-left corner stapling, with which the rotation angle is 0 degree, are shaded in the display such that the settings cannot be accepted.

As described above, in the case of giving an instruction to change a setting in the middle of an output bundle, the external controller performs control such that a setting change with which the image orientation in the latter portion of printing after the setting change is different from the image orientation on discharged paper in the former portion of printing cannot be selected. Thus, generation of a printed matter in which different image orientations are mixed in the entire bundle can be avoided.

Although a print job is deployed as an image by the external controller 104 and the deployed image is accumulated in the HDD 305 in the image forming apparatus 101 in the first and second embodiments, the present invention is not limited thereto. The image forming apparatus 101 may have a function of a printer, and may deploy a print job transmitted from the computer terminal 106 as an image and accumulate the deployed image in the HDD 305. Then, the computer terminal 106 may have a function of giving the flushing instruction and performing subsequent continuous printing. In this case, the external controller 104 may be omitted.

Although stapling has been taken as an example of the finishing (post-processing) performed by the finisher 205 in the description of the above embodiments, the present invention is not limited thereto. For example, the type of finishing is not limited to stapling, as long as an image orientation changes as a result of a change of a finishing position. For example, the type of finishing may be punching.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-125009, filed Jun. 13, 2013, which is hereby incorporated by reference herein in its entirety.

What is claimed is:

1. A printing apparatus to which a binding unit configured to execute binding processing on a plurality of sheets can be connected, comprising:
    a print unit configured to print images on a plurality of sheets based on a job in which executing of the binding processing at a first binding position is designated;
    an accepting unit configured to accept, while printing by the print unit based on the job is being interrupted, a request for changing a position of the binding processing from the first binding position to a second binding position; and
    a control unit configured to, in a case where a print orientation for executing the binding processing at the first binding position is different from a print orientation for executing the binding processing at the second binding position, perform a control to discharge the plurality of sheets on which the images are printed by the print unit according to the print orientation for executing the binding processing at the first binding position without causing the binding unit to execute the binding processing.

2. The printing apparatus according to claim 1, wherein in a case where interruption of printing by the printing unit is due to an occurrence of a jam error or running-out of paper.

3. The printing apparatus according to claim 1, wherein the control unit is configured to, in a case where the print orientation for executing the binding processing at the first binding position is same as the print orientation for executing the binding processing at the second binding position, cause the binding unit to execute the binding processing at the second binding position.

4. The printing apparatus according to claim 1, further comprising a display unit configured to perform a display indicating that the binding processing has not been executed, in a case where the binding processing has not been executed.

5. The printing apparatus according to claim 1, wherein the binding processing is stapling processing.

6. A control method for controlling a printing apparatus to which a binding unit configured to execute binding processing on a plurality of sheets can be connected, the control method comprising:
   a printing step of printing images on a plurality of sheets based on a job in which executing of the binding processing at a first binding position is designated;
   an accepting step of accepting, while printing in the printing step based on the job is being interrupted, a request for changing a position of the binding processing from the first binding position to a second binding position; and
   a control step of, in a case where a print orientation for executing the binding processing at the first binding position is different from a print orientation for executing the binding processing at the second binding position, performing a control to discharge the plurality of sheets on which the images are printed in the printing step according to the print orientation for executing the binding processing at the first binding position without causing the binding unit to execute the binding processing.

7. A non-transitory computer-readable storage medium on which is stored a program which when executed causes a computer to perform a control method for controlling a printing apparatus to which a binding unit configured to execute binding processing on a plurality of sheets can be connected, the control method comprising:
   a printing step of printing images an image on a plurality of sheets based on a job in which executing of the binding processing at a first binding position is designated sheet;
   an accepting step of accepting, while printing in the printing step based on the job is being interrupted, a request for changing a position of the binding processing from the first binding position to a second binding position; and
   a control step of, in a case where a print orientation for executing the binding processing at the first binding position is different from a print orientation for executing the binding processing at the second binding position, performing a control to discharge the plurality of sheets on which the images are printed in the printing step according to the print orientation for executing the binding processing at the first binding position without causing the binding unit to execute the binding processing.

* * * * *